Jan. 31, 1961 W. R. HART 2,969,562
APPARATUS FOR CURLING STRIPS OF THERMOPLASTIC MATERIAL
Filed Sept. 23, 1957 4 Sheets-Sheet 1

Jan. 31, 1961     W. R. HART     2,969,562
APPARATUS FOR CURLING STRIPS OF THERMOPLASTIC MATERIAL
Filed Sept. 23, 1957     4 Sheets-Sheet 2

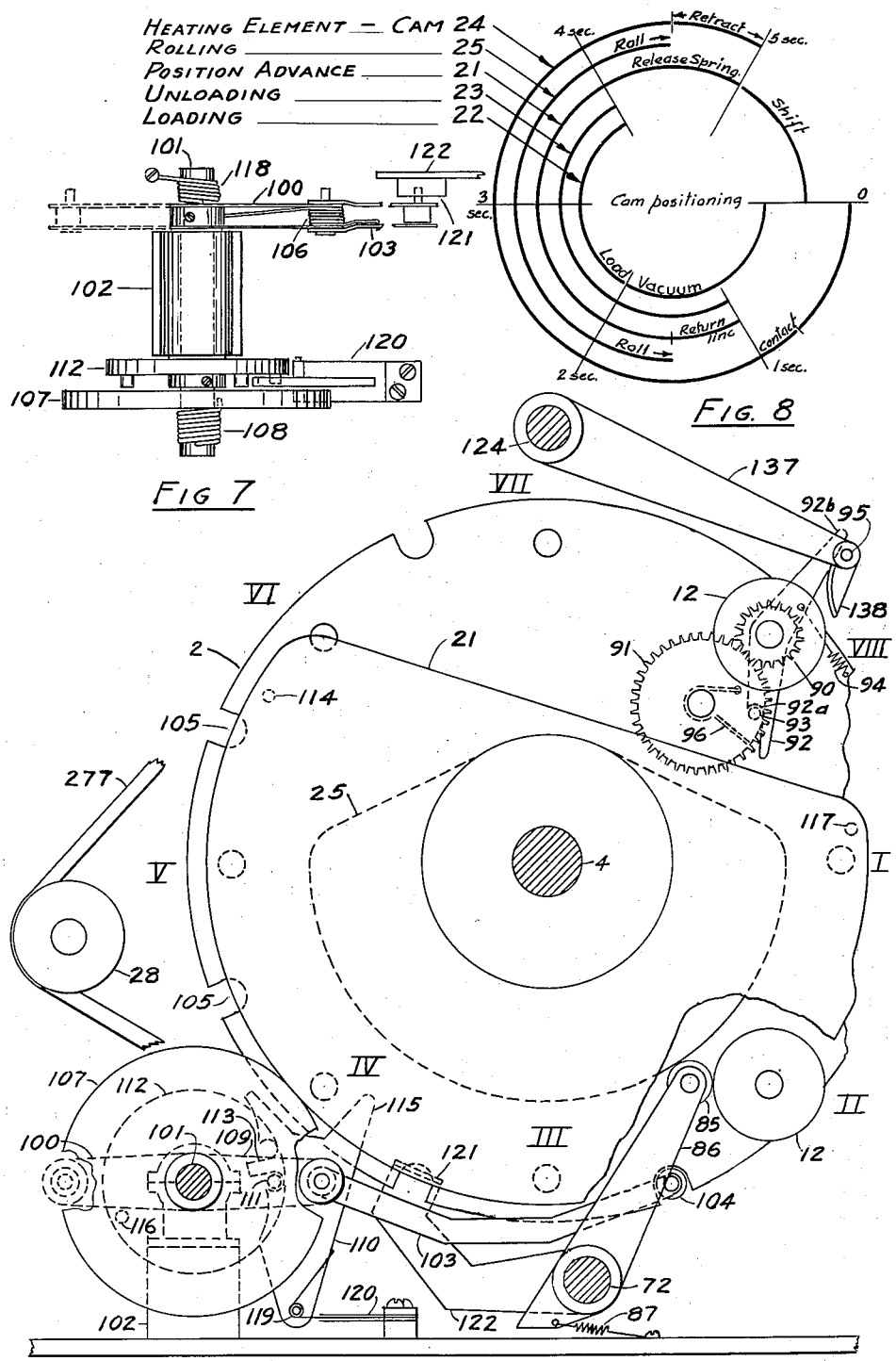

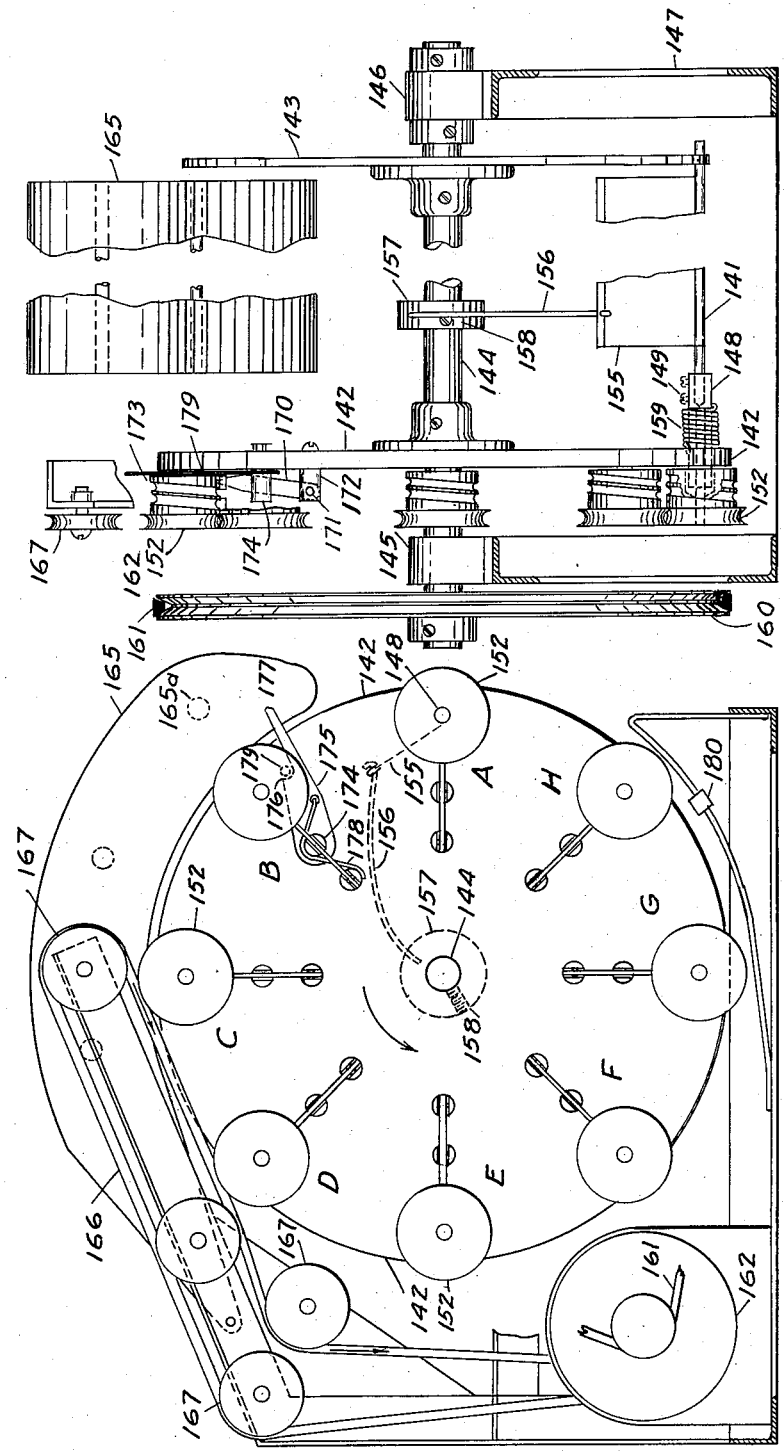

United States Patent Office 2,969,562
Patented Jan. 31, 1961

2,969,562
APPARATUS FOR CURLING STRIPS OF THERMOPLASTIC MATERIAL

Walter R. Hart, 33 5th Ave., Port Washington, N.Y.

Filed Sept. 23, 1957, Ser. No. 685,729

9 Claims. (Cl. 18—19)

The present invention relates to apparatus for curling strips of plastic or other thermoplastic material in a longitudinal direction so that the strip is of curved cross section. Preferably the strip is curled into tubular form with overlapping edges. Curled strips of this kind are useful for various purposes. For example, curled plastic strips having one or both edges notched to provide a comb-like configuration with spaced teeth or fingers are widely used as binders for holding papers together in the form of a book.

Heretofore the curling of such strips has been performed principally by hand and has been a tedious and costly operation. It is an object of the present invention to provide a machine for curling thermoplastic strips automatically, rapidly and economically.

The machine in accordance with the invention comprises a plurality of winding spindles or mandrels which are movable successively to a plurality of operating stations. A sheet of thin, flexible, heat conducting material for example brass foil having a thickness of the order of .001 inch is secured along one edge to each mandrel and adapted to wind up on the mandrel when a mandrel is rotated. A thermoplastic strip that is to be curled is placed where the mandrel and foil meet and the mandrel is rotated so as to wind the foil and strip on the mandrel, heat being applied to soften the strip so that it will conform to the mandrel. After the strip has been sufficiently cooled to retain its curled form, the strip and foil are unwound sufficiently to release the strip which is then slipped off the mandrel. The cycle of the machine comprises the operations of loading, heating and rolling the strips, cooling and unloading the mandrels being moved successively from one operative position to another.

The invention will be more fully understood from the following description of the preferred embodiments shown by way of example in the accompanying drawings in which:

Fig. 3 is a top view of one loading element.

Fig. 6 is a schematic cross section illustrating mechanism for winding and unwinding the foil on the mandrel and for shifting the mandrels periodically from one station to the next.

Fig. 7 is a top view of the shifting mechanism.

Fig. 8 is a diagrammatic view illustrating the cycle of operation of the machine.

Fig. 9 is an end view of another embodiment of the invention.

Fig. 10 is a front view of the apparatus shown in Fig. 9 with portions broken away.

General construction

Figure 1:
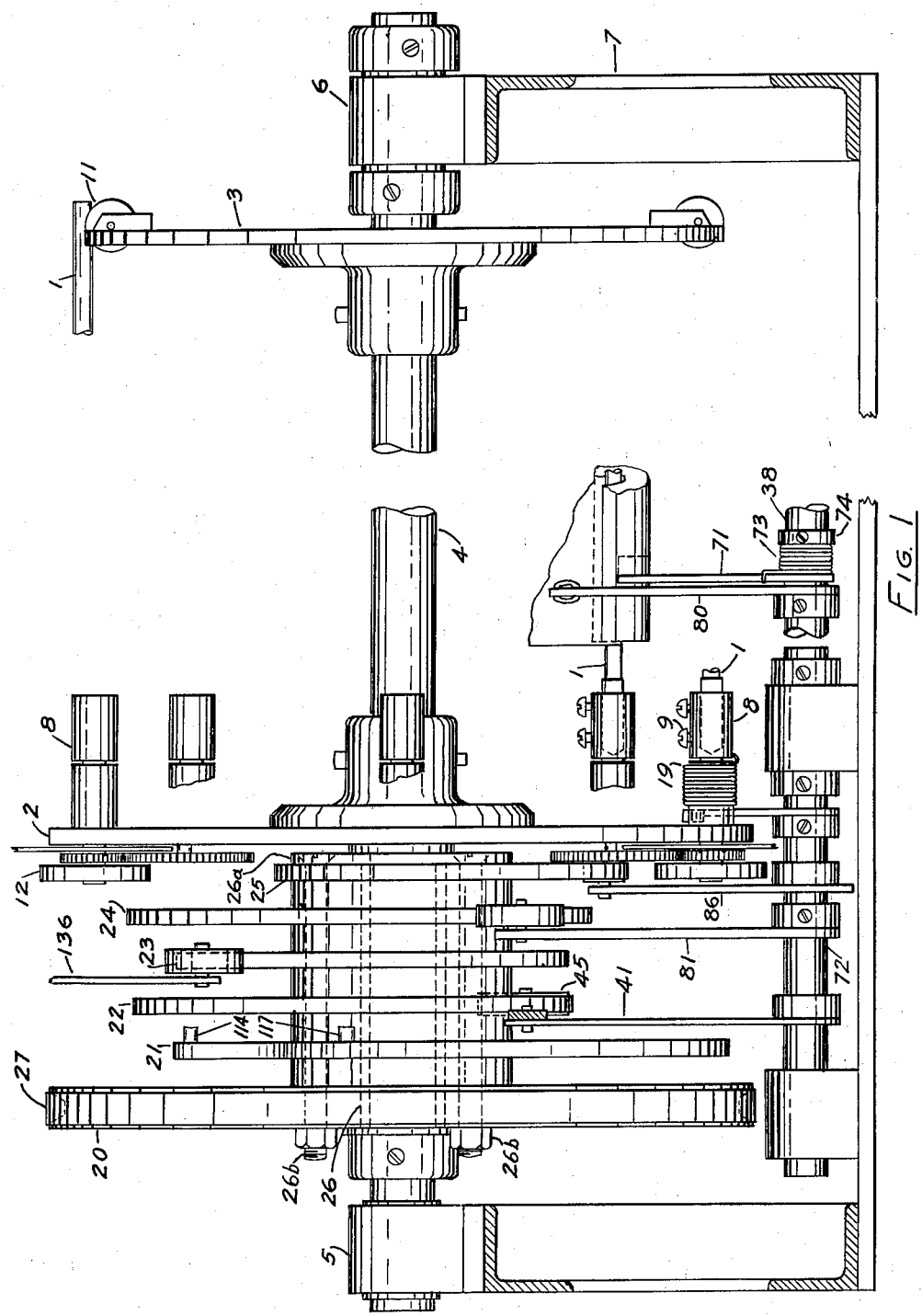
Fig. 1 is a front elevation of a machine in accordance with the invention, certain parts being omitted to avoid duplication and to simplify the drawings.

As illustrated in the drawings, the apparatus in accordance with the invention comprises a plurality of winding spindles or mandrels 1 mounted on a suitable carrier for moving them successively from one operating station to another. The carrier is shown as comprising a main disc 2 and auxiliary disc 3 which are spaced axially from one another and fixed on a shaft 4 rotatably supported by bearings 5 and 6 on a frame 7. One end of each spindle is removably secured in a hollow stub shaft 8 for example by set screws 9. The stub shafts 8 are rotatably supported in the main disc 2 near its periphery and are equally spaced in a circumferential direction. Their axes are parallel with the axis of the discs 2 and 3. The opposite end of each mandrel is positioned and supported by the auxiliary disc 3. Preferably an end portion of the rod rests on a roller 11 carried by the disc 3 with the axis of the roller tangential to the disc. The stub shafts 8 extend through the disc 2 and a disc 12 is fixed on the outboard end of each shaft for the purpose of rotating and controlling the shaft as will be described below.

A curtain or blind 15 of thin sheet material has an edge 15a secured to each of the mandrels 1. Preferably, the blind 15 is formed of material which is heat resistant and heat conducting for example brass foil having a thickness of the order of .001 inch. The edge of the foil is soldered, brazed or otherwise suitably secured to the mandrel. The blind extends through substantially the entire length of the mandrel except for the end portions by which the mandrel is supported and has a width sufficient to wind around the mandrel at least one complete turn and preferably two or more turns. The free edge of each blind 15 is reinforced by a wire or strip 15b. Each blind is elastically drawn in toward the shaft 4 by a plurality of springs 16, each having one end hooked into the reinforced edge 15b of the blind and the other end secured to a collar 17 on the shaft 4. The collar 17 can be turned on the shaft to vary the tension of the springs and is secured in adjusted position by a set screw 18. There should preferably be at least two springs 16 for each blind, the springs being uniformly spaced lengthwise of the blind. When the mandrels are of greater length, more springs are preferably used. A spiral spring 19 surrounds each of the shafts 8 and acts between the disc 2 and the stub shaft to turn the mandrel in a direction to unwind the blind 15, the mandrel being rotatable in the opposite direction by the disc 12. The pull of the springs 16 serves merely to keep the blind taut at all times.

A pulley 20 and a group of cams 21, 22, 23, 24 and 25 are mounted on a sleeve 26 having a flange 26a and secured together and to the flange by bolts 26b. The sleeve, cams and pulley are freely rotatable on the portion of the shaft 4 that projects outwardly beyond the main disc 2. The pulley 20 is driven at a selected speed by a V belt 27 from a gear motor drive 28 (Fig. 6). The pulley and cams rotate together but the pulley does not directly drive the shaft 4. The shaft 4 and the discs 2 and 3 which carry the mandrels are moved intermittently under control of one of the cams to move the mandrels from one operating station to the next each time the pulley makes one complete revolution. Thus when there are 8 mandrels, the pulley and cams make 8 revolutions for each complete rotation of the discs 2 and 3.

Loading mechanism

Figure 2:
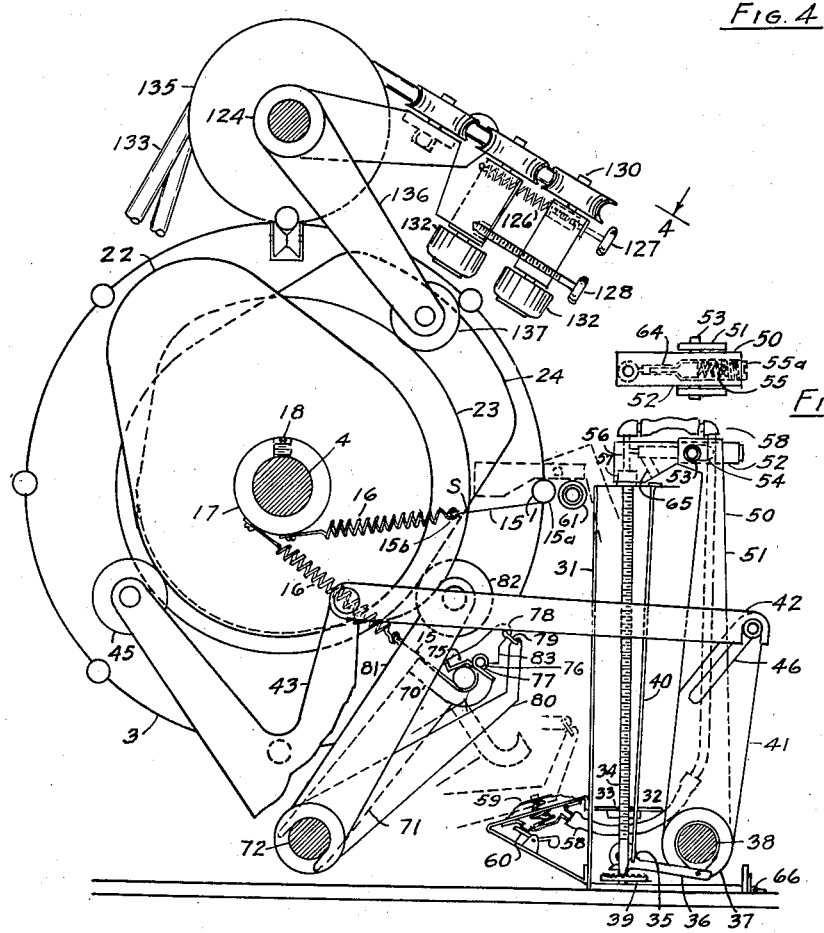
Fig. 2 is a schematic cross section illustrating mechanism for loading, heating and unloading.

As shown in Figs. 2 and 3, the loading mechanism comprises a three sided box 31 which is open at the front and is adapted to hold a stack of plastic strips that are to be curled. The strips rest on a platform 32 which is movable vertically to maintain the top of the stack at a predetermined constant level. The platform 32 is supported by two half nuts 33 disposed respectively at opposite ends of the platform and engaging rotatable threaded shafts 34 which are operatively connected by bevel gears 35 and a horizontally extending shaft (not shown). Only one of the threaded shafts 34 is shown in Fig. 2, the other being located at the opposite end of the platform 32. The shafts are rotatable to raise the platform 32 by means of a pawl 36 which is pivotally connected at one end to a short arm 37 on an oscillating shaft 38. The other end of the pawl is adapted to engage a ratchet wheel 39 on the lower end of one of the threaded shafts 34. A feeler rod 40 has a hook portion at its upper end adapted to rest on the top of the stack of strips and is pivotally connected at its lower end to the pawl 36. As strips are fed from the top of the stack, the feeler rod 40 drops down and permits the pawl 36 to come into engagement with teeth of the ratchet 39 so as to rotate the shafts 34 and raise the platform 32 until the top of the stack is restored to its proper level, at which level the pawl is disengaged from the ratchet.

The shaft 38 is oscillatable by an arm 41 connected by a link 42 to one arm of a bell crank lever 43 which is oscillatable on a shaft 72. The other arm of the bell crank lever 43 carries a roller 45 which engages cam 22 which as described above, rotates with the pulley 20. The link 42 is connected to the arm 41 by a pin extending through a slot 46 and adjustable in the slot to vary the stroke of the arm 41 as required to accommodate different widths of plastic strips. The shaft 38 extends longitudinally of the apparatus and carries two or more loading units 50. If only two loading units are used, they are located a short distance from the ends of the strips. For longer strips, additional loading units can be used. Each of the loading units 50 comprises an arm 51 which is fixed to and extends upwardly from the shaft 38. The upper end of the arm 51 is bifurcated to receive a block 52 which is pivotally connected to the block by a pivot pin 53 passing through an elongated hole 54 in the block. A spring 55 acts between the block and the pivot pin to hold the block normally in the position shown in Figs. 2 and 3. The block 52 is drilled to provide a vertical passageway 56 terminating in a recess to receive a short section of rubber tubing 57 which acts as a sucker to grip the top strip of plastic. The passage 56 is connected by capillary tubing 58 to a small bellows 59 having a valve 60. The bellows is actuated by an arm 80 forming part of the heater mechanism described below. The bellows 59 is operated in timed relation with the loading mechanism so as to be compressed just before a loading operation. Upon release, the bellows expands to produce a suction which is transmitted through the capillary tubing 58 to the suckers 57 causing them to grip the top strip. The shaft 38 is thereupon rocked in a counterclockwise direction by engagement of the bell crank roller 45 with the loading cam 22 causing the arms 51 to swing from the solid line position to the position shown in dotted lines in Fig. 2. The top strip is thereby slid off the stack in the holder 31. A plurality of rubber rollers 61 on a longitudinally extending shaft 62 rotated in a clockwise direction by a disc on the shaft engaging the back of the main drive belt 27 engage any strip that may stick to the top strip so as to assure that only one strip is fed at a time. As the block 52 begins its return movement from the dotted line position in Fig. 2, it tucks the edge of the strip S into the space defined by the junction of the blind 15 with the mandrel 1. When the edge of the strip engages the mandrel 1, the arm 51 continues its return movement to the right but the block 52 is held by the continued suction of the suckers 57. In order to break this suction automatically, there is provided a valve member 64 which is slidable lengthwise in a passage communicating with the suction passage 56. The valve member is connected at one end with the pivot pin 53 of the block 52. Continued movement of the arm 51 to the right while the block is held stationary by the plastic strip S is permitted by the elongated hole 54 in the block. Since the valve member 64 is connected to the pivot pin 53, this relative movement withdraws the valve member from its seat and admits air through a passageway 65 to break the vacuum of the suckers. The block 52 is thereby released from the strip and is returned by the spring 55 to its normal position relative to the arm 51. The tension of spring 55 is adjustable by a screw 55a to control the pull necessary to break the vacuum and thereby regulate the tightness with which the edge of the strip is tucked into the junction between the blind and mandrel.

The loading mechanism is mounted on the frame by hinges 66 so that the entire unit can be swung forward to provide access to the mandrels and a mounted mechanism and can be easily removed by withdrawing the hinge pins.

*Heating mechanism*

When a plastic strip S has been positioned on a blind 15 with its edge tucked into the space between the blind and the mandrel 1, the mandrel is moved to the next operating station and heat is applied to soften the plastic. As illustrtaed in Fig. 2, the strip is heated by a heating shoe 70 which extends longitudinally of the mandrel and is of a length slightly greater than that of the strip. The shoe is J shaped in cross section to provide a curved portion fitting around the mandrel and a straight portion that engages the blind 15. Heating of the shoe 70 is effected by an electrical heating element incorporated in the shoe and provided with suitable connections to a supply of current. The temperature of the shoe is preferably regulated thermostatically to maintain a selected temperature suitable for softening the particular plastic that is being curled. The heating element 70 is supported by two or more arms 71 which are bifurcated at their lower ends to slip onto an oscillating shaft 72 which provides a pivot about which the arms are swingable to move the heating element from the operative position shown in solid lines to the retracted position shown in dotted lines in Fig. 2. Coil springs 73 (Fig. 1) act between at least two of the arms 71 and adjustable collars 74 on shaft 72 to swing the heating element to operative position and press it resiliently against the mandrel and blind.

A pressure plate 75 is hinged to the shoe 70 at 76. A coil spring 77 acts between the pressure plate and the shoe so as to swing the pressure plate in a counterclockwise direction as viewed in Fig. 2 and thereby assure uniform contact between the mandrel and the heating element throughout their length. The pressure plate 75 is provided with two or more outwardly extending arms 78 connected by links 79 to operating arms 80 which are fixed to the oscillating shaft 72. The shaft 72 is also provided with an arm 81 carrying a roller 82 which engages the periphery of disc cam 24 controlling the operation of the heating mechanism. When the roller is engaged by the high portion of the cam, the shaft 72 is rocked in a clockwise direction. The arms 80 act through the links 79 to swing the pressure plate 75 in a clockwise direction until an abutment portion 83 engages an adjacent portion of the shoe 70. Thereupon the entire assembly comprising the shoe 70 and the pressure plate 75 is swung away from the mandrel to the dotted line position shown in Fig. 2. Conversely, when the shaft 72 is returned to its operative position, the heating shoe 70 moves into engagement with the mandrel and the pressure plate 75 then swings down to apply firm and uniform pressure. The heating unit is readily removable for replacement or servicing merely by unhooking the links 79 and lifting the arms 71 off the shaft 72.

Rolling mechanism

While the heating shoe 70 is in operative position, the mandrel 1 is rotated in a counterclockwise direction as viewed in Fig. 2 to roll the plastic strip and blind around the mandrel. As shown in Fig. 6, the rolling mechanism comprises a friction roller 85 carrier by an arm 86 which is rotatable on the shaft 72. A spring 87 acts between a lower end portion of the arm 86 and the frame to swing the arm in a counterclockwise direction and thereby urge the roller 85 into engagement with the cam 25 which controls the rolling operation. The cam has a high portion which is concentric with the shaft 4 and is of such radius that when it engages the roller 85 it swings the roller into engagement with the disc 12 of the mandrel which is at the heating and rolling station. The roller 85 thereby provides a friction drive between the rotating cam 25 and the disc 12 to rotate the disc and hence the mandrel in a counterclockwise direction and thereby roll the plastic strip and blind onto the mandrel.

Means is provided for holding the mandrel in woundup position for predetermined portion of the cycle, then releasing it so that the mandrel is unwound by the action of springs 19 (Fig. 1) and 16 (Fig. 2) and for limiting the unwinding rotation of the mandrel. As illustrated in Fig. 6 a gear 90 fixed on the stub shaft 8 adjacent the disc 12 meshes with a larger gear 91 rotatably supported on disc 2. The diameters of gears 90 and 91 are selected according to the desired rotation of the mandrel. If, for example, it is desired to give the mandrel two complete turns the diameter of gear 91 is somewhat more than twice the diameter of gear 90 in order to provide for two turns with a certain amount of overthrow. The mandrel is held in woundup position by a latch 92 which is pivotally mounted on the stub shaft 8 and has a detent portion 92a adapted to engage a pin 93 on the larger gear 91. A light spring 94 tends to swing the latch into position to engage the pin. When the mandrel is wound up, the pin 93 travels slightly beyond the detent 92a before the roller 85 on arm 86 reaches the end of the high portion of cam 25. When the roller leaves the high portion of the cam, the pin 93 drops back into engagement with the detent 92a thereby holding the mandrel in wound up position.

When a mandrel reaches a point at which it is to be unwound, a nose portion 92b of the latch 92 engages an abutment which is shown as a pin 95 on an arm forming a part of the unloading mechanism. The latch is thereby released, permitting the mandrel to unwind under the action of spring 19, the blind being kept taut by the pull of springs 16. The unwinding rotation of the mandrel is limited by engagement of the pin 93 on gear 91 with a spring abutment 96. Excessive unwinding rotation of the mandrel is thereby prevented.

Shifting mechanism

Since the loading and unloading operations require less time than heating and rolling, the capacity of the machine is determined by the time required for the heating and rolling operation and the time required to shift the mandrels from one operating station to the next. It is thereby desirable to shift the mandrels quickly while at the same time avoiding shock. As illustrated in Figs. 6 and 7, the shifting mechanism comprises a crank arm 100 fixed on a shaft 101 rotatably supported by a bearing block 102 mounted on the frame of the machine. A bifurcated link 103 is pivotally connected at one end to the crank 100 and at the opposite end carries a roller 104 adapted to engage in notches 105 provided in the periphery of disc 2. A light spring 106 biases the link 103 in a direction toward the disc. The shaft 101 is rotatable through 180 degrees to swing the arm 100 from the position shown in solid lines in Figs. 6 and 7 to the position shown in dotted lines in Figs. 6 and 7 and thereby move the disc 2 through a predetermined arc by engagement of the roller 104 on link 103 with a notch 105 in the disc.

Rotation of the shaft 101 is effected by a disc 107 which is rotatable on the shaft and is connected to it by a spiral spring 108. Cam 21 which operates and controls the shifting mechanism has a concentric portion that engages the periphery of disc 107 and thereby rotates the disc to wind up the spring 108. While the spring 108 is being wound up, the shaft 101 is held against rotation by the engagement of a spring pressed latch member 110 with a pin 111 on a disc 112 that is fixed on shaft 101. The latch 110 is shaped to provide notches on opposite sides of an abutment portion 113, the pin 111 being held in one of these notches. Before the cam 21 leaves the driven disc 107, a pin 114 on the side of the cam engages a nose portion 115 of the latch to withdraw the latch and thereby release the disc 112 and shaft 101. The force of the woundup spring 108 thereupon rotates shaft 101 through approximately 180 degrees in a clockwise direction as viewed in Fig. 6, until a second pin 116 on the disc 112 engages the abutment portion 113 of the latch 110—which has by then been released—and drops into the notch on the opposite side of the abutment. The rotation of the shaft 101 is transmitted through the arm 100 and link 103 to rotate the disc 2 through a predetermined arc corresponding to movement of the mandrels from one operating station to the next. Although the shaft 101 turns quickly, the movement transmitted to the disc 2 is essentially harmonic motion so that the disc is accelerated and decelerated without shock.

The shifting mechanism is restored to its original position later in the cycle while the main disc 2 is held against rotation by engagement of the heater shoe 70 with one of the mandrels. At this time, the cam 21 is out of engagement with the driven disc 107. A second pin 117 on the side of the cam 21, engages the nose portion 115 of the latch 110 to release the pin 116. A relatively light spring 118 thereupon rotates the shaft 101 in a counterclockwise direction as viewed in Fig. 6 until pin 111 strikes the abutment 113. The latch is shown pivotally mounted at 119 on a spring arm 120 so as to cushion the engagement of pins 111 and 116 with the abutment portion of the latch. Prior to the release of the shaft 101 for its return movement, a hook portion 121 of an arm 122 on shaft 72 pulls the link 103 downwardly to disengage the roller 104 from the notch 105 in disc 2. As the link 103 reaches the end of its return stroke, the roller engages in the next notch. The mechanism is thereupon positioned for the next shifting operation.

Unloading mechanism

Figure 5:
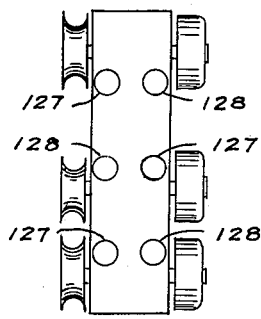
Fig. 5 is a side view taken approximately on the line 5—5 in Fig. 4.
Figure 4:
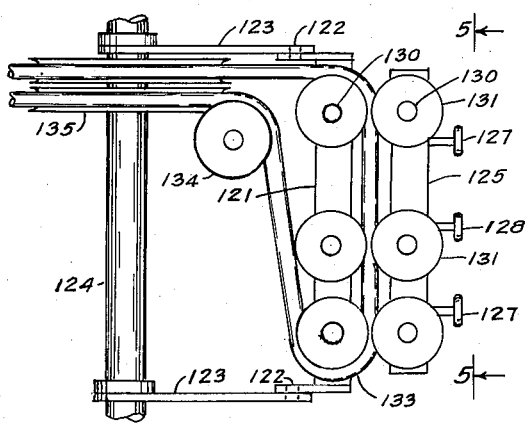
Fig. 4 is a top view of unloading mechanism as viewed approximately from the line 4—4 in Fig. 2.

After a strip has been curled as described above and has been allowed to cool sufficiently to retain its curl, the mandrel is released and is rotated by its return spring 19 to unwind the blind. However, the strip is still curled around the mandrel and must be removed from the mandrel in an endwise direction. The mechanism for successively removing the coiled strips from the mandrels comprises a block 121 (Figs. 2 and 4) which is pivotally supported at 122 on spaced arms 123 projecting from and fixed to a shaft 124 which extends parallel to shaft 4 and is rotatably supported by a portion of the frame. A second block 125 is connected to the first by springs 126, the tension of which is adjustable by screws 127. A second set of screws 128 holds the blocks a selected distance apart and maintains the block 125 in proper position relative to block 121. The spacing screws 128 and springs 126 are arranged, for example as shown in Fig. 5, to provide tension between the blocks while maintaining selected spacing. A plurality of short shafts 130 are rotatably supported by each of the blocks. A pulley 131 is fixed on the upper end of each shaft while the lower end carries a soft rubber roller 132. The pulleys and hence the rollers are driven by a round belt 133 which runs between the pulleys on one block and those on the other. The belt is further guided by an idler pulley 134 and by pulleys 135 which rotate freely on shaft 124 and is suitably driven for example by a pulley on the main motor drive. The assembly comprising blocks 121 and 125 is movable from an inoperative position as shown in Fig. 2 to a position in which the rollers 132 engage opposite sides of a curled strip on a mandrel 1 at the unloading station. Movement of the assembly is effected by an arm 136 which is fixed on the shaft 124 and carries a roller 137 engaging the periphery of cam 23 which controls the unloading operation. The spacing between the opposite sets of rollers to accommodate mandrels of different sizes is readily adjustable by means of screws 127 and 128. These screws also serve to adjust the pressure of the pulleys 131 against the belt 133. Two pairs of the rollers 132 are adapted to engage the curled strip on the mandrel when the unloading device is lowered into operating position while the third pair is located beyond the end of the mandrel and serves to eject the curled tube out of the machine. By reason of the pivotal mounting 122, the unloading head comprising blocks 121 and 125 together with the pulleys and rollers engages a curled strip on the mandrel only by its own weight so as to avoid any forcing or jamming. The pivotal connection is such as to prevent the unloading head from dropping down when it is raised to inoperative position.

In order to free the curled strip completely from any pinching or gripping action between the mandrel and blind, it is desirable to turn the mandrel in an unwinding direction a little past its normal unwound position. For this purpose, an arm 137 (Fig. 6) carrying at its end a spring pressed finger 138 is secured to shaft 124 in position for the finger 138 to engage the driving disc 12 of a mandrel 1 in unloading position when the shaft 124 is turned in a clockwise direction to lower the unloading head. Frictional engagement of the finger 138 with the periphery of disc 12 rotates the disc slightly in a clockwise direction and thereby assures that the curled strip is freed completely and can slip off the mandrel easily. It will be understood that one end of the mandrel is secured to the rotating sleeve 8 while the other end rests freely on a roller 11 supported by disc 3. A curled strip can hence be slipped freely off the mandrel in an endwise direction away from the main disc 2.

The operation of the machine will be readily understood from the foregoing description and from the diagram of Fig. 8 which indicates the timing of the operations of a cycle. The operating cams 21 to 25 are positioned to provide the timing indicated in Fig. 8 rather than as shown in Figs. 2 and 6 where the positions of the cams are selected to provide clarity of the drawings. In Fig. 6, the several operating stations are indicated by Roman numerals. The loading operation is effected when the mandrel is at station number I. At station II heat is applied and the mandrel is rotated to wind up the blind and strip. The mandrel is held in wound position through stations III to VII to permit the curled strip to cool. Unwinding is effected as the mandrel reaches station VIII where the curled strip is removed by the unloading mechanism.

*Second embodiment*

The embodiment of my invention shown in Figs. 9 and 10 is similar in construction and operation to that of Figs. 1 to 8. A plurality of spindles or mandrels 141 are mounted on a carrier comprising a main disc 142 and an auxiliary disc 143 which are spaced axially from one another and fixed on a shaft 144 rotatably supported by bearings 145 and 146 on a frame 147. The machine is shown with 8 spindles but more or fewer may be employed according to the desired size and capacity of the machine. One end of each spindle is removably secured in a hollow stub shaft 148 by set screws 149. The stub shafts 148 are rotatably supported by the main disc 142 with their axes parallel to the shaft 144. The opposite end of each mandrel is positioned and supported by resting in a notch in the auxiliary disc 143. The stub shafts 148 extend through the disc 142 and a pulley 152 is fixed on the outboard end of each shaft.

A curtain or blind 155 of thin sheet material, for example brass foil, has one edge secured to each of the mandrels 141 and is reinforced at its free edge by a wire or strip. Leaf or wire springs 156 held by collars 157 on the shaft 144 act on the free edges of the blinds 155 to hold the blinds taut in an approximately tangential position as shown in Fig. 9. The tension of the springs 156 is adjustably by rotating the collars 157 on the shaft and securing them in adjusted position by set screws 158. A spiral spring 159 (Fig. 10) acts on each of the stub shafts 148 to unwind the mandrel after it has been wound up by the pulley 152.

While the carrier comprising discs 142 and 143 may be rotated intermittently as in the embodiment of Figs. 1 to 8, the apparatus is simplified by rotating the carrier continuously at a selected speed. For this purpose a pulley 160 is fixed to an outboard end portion of shaft 144 and is driven by a belt 161 from a suitable motor drive 162 which preferably provides for variation of speed.

When a mandrel is approximately at position A a strip of plastic material to be curled is placed on the curtain 155 with its lower edge engaging the mandrel 141. As the carrier continues to turn, the mandrel passes under a heating unit 165 which heats and softens the plastic strip. The heating unit is shown as comprising a reflector and a plurality of tubular heat lamps 165a. It will be noted that the curtains 155 hold the strips approximately perpendicular to the heat rays so that the strip is effectively and quickly heated by the radiant energy of the heating unit.

When a mandrel reaches position C, its pulley 152 comes into engagement with a round belt 166 which runs continuously over guide pulleys 167 and is driven in the direction of the arrow from the motor drive 162. The pulley 152 remains in contact with the belt approximately from position C to position D. During this time, the pulley is rotated in a counterclockwise direction as viewed in Fig. 9 to roll up the curtain 155 and the softened plastic strip on the mandrel. Rotation of the mandrel is limited for example to approximately two turns by a lever 170, one end of which is pivotally supported at 171 on a post 172 mounted on the outer face of the disc 142 while the free end is shaped to engage and follow a helical groove or thread 173 provided on a sleeve or hub portion fixed to the pulley 152 and stub shaft 148. The lever 170 is further guided by sliding in a slotted stud 174 mounted on disc 142. As the pulley and mandrel are rotated by the belt 166, the end of lever 170 follows the helical groove 173 and when it reaches the end of the groove, it holds the pulley against further rotation. The belt 166 thereupon slips on the pulley. The amount the mandrel is turned is thus determined by the length of the helical groove 173. For example, if the mandrel is to be given two revolutions the groove 173 has slightly more than two complete turns to compensate for the thickness of the lever 170.

The mandrel is held in woundup position against the tension of return spring 159 by suitable latch mechanism. The means for holding the mandrel is shown in the drawings as a latch member 175 which is pivotally supported at one end by the stud 174. The latch 175 has a shoulder or detent portion 176 and an outwardly projecting nose portion 177. A spring 178 exerts a force to swing the latch in a counterclockwise direction as viewed in Fig. 9 to bring the detent portion 176 into the path of movement of a pin 179 on the inner face of the hub portion of pulley 152. When the curtain and plastic strip are wound up on the mandrel as described above, the pin 179 engages detent 176 to hold the mandrel against unwinding. The mandrel remains wound up from approximately position D to position G. During this time the strip cools sufficiently to retain its shape. A blower or other cooling means may be provided if desired although it has not been found necessary. As the mandrel approaches the position H, the nose portion 177 of latch 175 engages an adjustable stationary trip 180 to release the pin 179 from the detent portion 176 of the latch. The mandrel is thereupon unwound by spring 159 (Fig. 9). During the unwinding the curtain 155 is kept taut by the springs 156. The curled strip is then removed by slipping it lengthwise off the free end of the mandrel.

No loading or unloading mechanism is shown in Fig. 9 and 10. These operations may be performed manually or suitable mechanism for loading and unloading automatically may be provided. It will be understood that various features and mechanisms of the two embodiments are mutually interchangeable. Still other changes can be made in the specific construction of the machine and it is therefore not intended to limit the invention to the embodiments shown by way of example in the drawings and herein particularly described.

What I claim is:

1. Apparatus for curling blanks of thermoplastic sheet material comprising a movable carrier, a plurality of rotatable mandrels on said carrier, means for moving the carrier to move said mandrels through a selected path, a flexible curtain associated with each of the mandrels and having an edge secured to the mandrel, said curtain being adapted to receive a blank to be curled and to be wound with said blank on the mandrel, means for heating said blank to a selected temperature at which said blank is formable, means for rotating each of the mandrels to wind on the mandrel the associated curtain and a blank position on the curtain, said blank being thereby curled, means for unwinding the curtain for removal of said blank after it has cooled sufficiently to retain its curled form, and means for coordinating said heating, winding and unwinding operations.

2. Apparatus according to claim 1, in which said carrier comprises a rotatable shaft and a pair of discs spaced axially on said shaft, said mandrels extending between and being rotatably supported by said discs.

3. Apparatus according to claim 1, in which said mandrels are moved continuously in a closed path by said carrier.

4. Apparatus according to claim 3, in which said heating means comprises a stationary radiant heater positioned to direct heat on blanks positioned on said curtains as said mandrels and associated curtains are moved past said heating means.

5. Apparatus according to claim 1, in which said mandrels are moved intermittently in a closed path by said carrier.

6. Apparatus according to claim 5, in which said heating means comprises a contact heater engageable with said curtain while it is being wound on said mandrel.

7. Apparatus according to claim 6, in which said heating means further comprises means for moving said heater into contact with a curtain when the associated mandrel is in selected position, holding the heater in contact with said curtain while it is being wound on the mandrel and thereafter withdrawing the heater.

8. Apparatus according to claim 1, further comprising means for removing the curled blanks in an axial direction from the mandrels.

9. Apparatus for curling blanks of thermoplastic sheet material comprising a plurality of rotatable mandrels, a flexible curtain associated with each of the mandrels and having an edge secured to the mandrel, said curtain being adapted to receive a blank to be curled and to be wound with said blank on the mandrel, means for heating a blank positioned on a curtain to a selected temperature at which said blank is formable, means for rotating the mandrels to wind on each mandrel the associated curtain and a blank positioned on the curtain, said blank being thereby curled, means for unwinding the curtain for removal of said blank after it has cooled sufficiently to retain its curled form, and means for coordinating and controlling said heating, winding and unwinding operations.

References Cited in the file of this patent

UNITED STATES PATENTS

| | | |
|---|---|---|
| 1,801,309 | Gipe | Apr. 21, 1931 |
| 2,049,850 | Lytle et al. | Aug. 4, 1936 |
| 2,116,916 | Van Hyning | May 10, 1938 |
| 2,163,318 | Scusa et al. | June 20, 1939 |
| 2,304,629 | Emmer | Dec. 8, 1942 |
| 2,334,793 | Scusa | Nov. 23, 1943 |
| 2,403,644 | Emmer | July 9, 1946 |
| 2,628,387 | Landau | Feb. 17, 1953 |
| 2,703,209 | Crutcher | Mar. 1, 1955 |
| 2,867,846 | Rowley | Jan. 13, 1959 |
| 2,910,729 | Schaller et al. | Nov. 3, 1959 |

FOREIGN PATENTS

| | | |
|---|---|---|
| 70,824 | Sweden | June 29, 1922 |